(12) United States Patent
Ma et al.

(10) Patent No.: US 11,106,795 B2
(45) Date of Patent: Aug. 31, 2021

(54) METHOD AND APPARATUS FOR UPDATING SHARED DATA IN A MULTI-CORE PROCESSOR ENVIRONMENT

(71) Applicant: ADVANCED NEW TECHNOLOGIES CO., LTD., Grand Cayman (KY)

(72) Inventors: Ling Ma, Hangzhou (CN); Changhua He, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 71 days.

(21) Appl. No.: 16/660,563

(22) Filed: Oct. 22, 2019

(65) Prior Publication Data

US 2020/0134182 A1  Apr. 30, 2020

(30) Foreign Application Priority Data

Oct. 26, 2018 (CN) .......................... 201811258200.1

(51) Int. Cl.
*G06F 9/54* (2006.01)
*G06F 21/57* (2013.01)
(Continued)

(52) U.S. Cl.
CPC ............... *G06F 21/57* (2013.01); *G06F 9/48* (2013.01); *G06F 9/542* (2013.01); *G06F 15/80* (2013.01)

(58) Field of Classification Search
None
See application file for complete search history.

(56) References Cited

U.S. PATENT DOCUMENTS 5,537,574 A * 7/1996 Elko .......................... G06F 9/52
700/5
6,651,145 B1 11/2003 Jamil et al.
(Continued)

FOREIGN PATENT DOCUMENTS

CN        1577311 A     2/2005
CN      101504618 A     8/2009
(Continued)

OTHER PUBLICATIONS

Written Opinion and International Search Report for PCT Application No. PCT/US2019/057475 dated Dec. 19, 2019 (13 pages).
(Continued)

*Primary Examiner* — Michael Sun

(57) ABSTRACT

Embodiments of the specification provide a method and an apparatus for updating shared data in a multi-core processor environment. The multi-processor environment comprises a multi-core processor. The multi-core processor comprises a plurality of separate processing units (referred to as cores, or core processing units (CPUs) in the specification); the multi-core processor is configured to process a multi-threaded task; the multi-threaded task has shared data to update. The method is executed by any CPU. The method may comprise: requesting, by a first CPU, for a lock to execute a critical section function on the shared data, wherein the lock provides permission to update the shared data, and the critical section function updates the shared data; and setting, by the first CPU if the lock is occupied by a second CPU, a memory index corresponding to the critical section function in a memory of the lock for the second CPU to execute the critical section function based on the memory index.

18 Claims, 3 Drawing Sheets

(51) Int. Cl.
*G06F 9/48* (2006.01)
*G06F 15/80* (2006.01)

(56) References Cited

U.S. PATENT DOCUMENTS

| | | | |
|---|---|---|---|
| 7,987,321 B1 | 7/2011 | Agarwal et al. | |
| 8,578,483 B2* | 11/2013 | Seshadri | G06F 21/57 |
| | | | 726/22 |
| 8,738,860 B1* | 5/2014 | Griffin | G06F 13/4022 |
| | | | 711/122 |
| 8,776,034 B2 | 7/2014 | Chen et al. | |
| 9,298,626 B2* | 3/2016 | Busaba | G06F 12/0828 |
| 10,360,063 B2* | 7/2019 | Zhao | G06F 9/4818 |
| 10,387,332 B1 | 8/2019 | Metcalf et al. | |
| 2004/0059875 A1 | 3/2004 | Garg et al. | |
| 2004/0268354 A1 | 12/2004 | Kanai et al. | |
| 2006/0161740 A1 | 7/2006 | Kottapalli et al. | |
| 2008/0028403 A1 | 1/2008 | Hoover et al. | |
| 2008/0104085 A1* | 5/2008 | Papoutsakis | G06F 16/217 |
| 2010/0275209 A1 | 10/2010 | Detlefs | |
| 2011/0113221 A1 | 5/2011 | Vajda | |
| 2012/0011106 A1 | 1/2012 | Reid et al. | |
| 2013/0024645 A1 | 1/2013 | Cheriton et al. | |
| 2013/0031331 A1 | 1/2013 | Cheriton et al. | |
| 2013/0117753 A1 | 5/2013 | Gounares et al. | |
| 2013/0254488 A1 | 9/2013 | Kaxiras et al. | |
| 2014/0337857 A1 | 11/2014 | Kottapalli et al. | |
| 2015/0212818 A1* | 7/2015 | Gschwind | H04L 9/3213 |
| | | | 712/216 |
| 2015/0278094 A1 | 10/2015 | Ma et al. | |
| 2017/0017435 A1* | 1/2017 | Peeters | G06F 3/0659 |
| 2017/0083364 A1* | 3/2017 | Zhao | G06F 9/5083 |
| 2017/0235579 A1 | 8/2017 | Knauth et al. | |
| 2018/0039576 A1 | 2/2018 | Vorbach | |
| 2018/0189067 A1 | 7/2018 | Busaba et al. | |
| 2018/0337958 A1 | 11/2018 | Nagarkar | |

FOREIGN PATENT DOCUMENTS

| | | |
|---|---|---|
| CN | 101833476 A | 9/2010 |
| CN | 102331923 A | 1/2012 |
| CN | 103577158 A | 2/2014 |
| CN | 104216684 A | 12/2014 |
| CN | 104216767 A | 12/2014 |
| CN | 104424142 A | 3/2015 |
| CN | 104951240 A | 9/2015 |
| CN | 108345452 A | 7/2018 |
| EP | 0351556 A2 | 1/1990 |
| EP | 2175368 A1 | 4/2010 |
| TW | 201729574 A | 8/2017 |

OTHER PUBLICATIONS

International Preliminary Report on Patentability for PCT Application No. PCT/US2019/057475 dated Feb. 27, 2020 (15 pages).
First Search for Chinese Application No. 201811258200.1 dated Apr. 15, 2020.
Supplementary Search for Chinese Application No. 201811258200.1 dated May 6, 2020.
Search Report for Taiwanese Application No. 108122771 dated Jul. 24, 2020.

* cited by examiner

Memory[n]

METHOD AND APPARATUS FOR UPDATING SHARED DATA IN A MULTI-CORE PROCESSOR ENVIRONMENT

CROSS REFERENCE TO RELATED APPLICATION

The present application is based on and claims priority to Chinese Patent Application No. 201811258200.1, filed on Oct. 26, 2018, which is incorporated herein by reference in its entirety.

TECHNICAL FIELD

One or more embodiments of the specification relate to the technical field of computer technologies, particularly to a method and apparatus for updating shared data in a multi-core processor environment.

BACKGROUND

Multi-core processor refers to an integrated circuit that contains multiple separate process units (e.g., core processing units, or CPUs). Since multi-core processors yield better performance (by supporting parallel processing) and reduce power consumption, they are replacing traditional, single-core processors, and have been applied in many application domains such as cloud computing, data warehousing, and on-line shopping. When a multi-core processor is used to run a multi-threaded task, the multiple threads may have shared data (Shared_Data) to operate on. It is well understood that concurrent updates to the shared data can lead to unexpected or erroneous behavior. As a result, only one thread may be allowed to access and update the shared data at a time. In current processing technologies, a lock (Lock) may be applied for between the threads, and a thread that successfully obtains the lock may operate on the shared data, while threads that do not obtain the lock have to wait. In addition, the thread that successfully obtains the lock will migrate the lock and shared data into a private cache of a corresponding CPU. Such migration of the lock and shared data back and forth among the CPUs during execution by different threads affect the time required for completing the execution by all threads, leading to a low execution efficiency of multi-threaded tasks.

SUMMARY

One or more embodiments of the specification provide a method and apparatus for updating shared data in a multi-core processor environment.

According to one or more embodiments of the specification, a method for updating shared data in a multi-core processor environment is provided. The method is applied to a multi-core processor, wherein the multi-core processor is configured to process a multi-threaded task, the multi-core processor comprises a plurality of separate processing units (referred to as cores, or core processing units (CPUs) in the specification), the multiple threads of the task have a shared data to update. The method may comprise: requesting, by a first CPU, for a lock to execute a critical section function on the shared data, wherein the lock provides permission to update the shared data, and the critical section function updates the shared data; and setting, by the first CPU if the lock is occupied by a second CPU, a memory index corresponding to the critical section function in a memory of the lock for the second CPU to execute the critical section function based on the memory index.

In some embodiments, the requesting for a lock may comprise: requesting, by the first CPU, for the lock through a lock requesting command, wherein the lock requesting command includes the memory index corresponding to the critical section function.

In some embodiments, the setting a memory index corresponding to the critical section function in a memory of the lock may comprise: setting, by the first CPU based on the memory index included in the lock requesting command, a bit corresponding to the memory index in the memory of the lock to 1.

In some embodiments, the method may further comprise: detecting, by the first CPU, that the second CPU has executed the critical section function; and determining, by the first CPU, that the update on the shared data is complete.

In some embodiments, the method may further comprise: setting, by the first CPU, an identifier in a private cache of the first CPU before requesting for the lock to execute the critical section function, wherein the identifier indicates whether the critical section function has been executed, and wherein detecting that the second CPU has executed the critical section comprises: determining, by the first CPU, that the critical section function has been executed by the second CPU if the identifier in the private cache of the first CPU has been cleared.

In some embodiments, the method may further comprise: obtaining, by the first CPU if the lock is not occupied by another CPU, the lock; and executing, by the first CPU if it obtains the lock, the critical section function, wherein the critical section function updates the shared data.

In some embodiments, the method may further comprise: determining, by the first CPU if it obtains the lock, if whether the memory of the lock has one or more memory indices set by one or more of other CPUs, wherein the one or more memory indices correspond to one or more critical section functions; and executing, by the first CPU if the memory of the lock has one or more memory indices set by one or more of other CPUs, the one or more critical section functions based on the one or more memory indices.

In some embodiments, the executing the one or more critical section functions may comprise: obtaining, by the first CPU for each of the one or more critical section functions, a function pointer and a parameter pointer from a memory region based on one of the one or more memory indices corresponding to the one or more critical section function, wherein the memory region contains a function pointer and a parameter pointer; executing, by the first CPU for each of the one or more critical section functions, based on the function pointer and the parameter pointer, the critical section function based on the obtained function pointer and the obtained parameter pointer, wherein the critical section function uses one or more shared data write commands to updates the shared data; and storing, by the first CPU after executing all of the one or more critical section functions, the updated shared data into a cache memory shared by the plurality of CPUs.

In some embodiments, the memory region is inside the private cache of the first CPU.

In some embodiments, the method further comprises: placing, by the first CPU, the lock into a cache shared by the plurality of CPUs.

In some embodiments, the determining if the memory of the lock has one or more memory indices set by one or more of other CPUs may comprise: executing, by the first CPU, a lock releasing command to obtain a return value, wherein the return value comprises an XOR value of an initial state and a current state of the memory of the lock; obtaining, by the first CPU if the return value is not 0, the one or more memory indices set by the one or more of other CPUs based on the obtained return value of the lock releasing command; and setting, by the first CPU if the return value is not 0, the memory of the lock to its initial state.

According to some other embodiments of the specification, an apparatus for updating shared data in a multi-core processor environment is provided. The apparatus comprises a plurality of CPUs. The apparatus is configured to process a multi-threaded task; the multiple threads have shared data to be updated. Each of the plurality of CPUs in the apparatus is configured to execute one or more operations. The operations may be in the multiple threads. The operations may comprise: requesting, by a first CPU, for a lock to execute a critical section function on the shared data, wherein the lock provides permission to update the shared data, and the critical section function updates the shared data; setting, by the first CPU if the lock is occupied by a second CPU, a memory index corresponding to the critical section function in a memory of the lock for the second CPU to execute the critical section function based on the memory index.

In some embodiments, the requesting for a lock may comprise: requesting, by the first CPU, for the lock through a lock requesting command, wherein the lock requesting command includes the memory index corresponding to the critical section function; migrating, by the first CPU if it obtains the lock, the lock into the private cache of the first CPU; and setting, by the first CPU, the memory index corresponding to the critical section function in the memory of the lock.

In some embodiments, the operations may further comprise: setting, by the first CPU, an identifier in a private cache of the first CPU before requesting for the lock to execute the critical section function, wherein the identifier indicates whether the critical section function has been executed; and determining, by the first CPU, that the critical section function has been executed by the second CPU if the identifier in the private cache of the first CPU has been cleared.

In some embodiments, the operations may further comprise: obtaining, by the first CPU if the lock is not occupied by another CPU, the lock to execute the critical section function, wherein the critical section function updates the shared data; and executing, by the first CPU if it obtains the lock, the critical section function.

In some embodiments, the operations may further comprise: determining, by the first CPU if it obtains the lock, whether the memory of the lock has one or more memory indices set by one or more of other CPUs, wherein the one or more memory indices correspond to one or more critical section functions; and executing, by the first CPU if the memory of the lock has one or more memory indices set by one or more of other CPUs, the one or more critical section functions based on the one or more memory indices.

In some embodiments, the executing the one or more critical section functions may comprise: obtaining, by the first CPU for each of the one or more critical section functions, a memory region based on one of the one or more memory indices corresponding to the critical section function, wherein the memory region contains a function pointer and a parameter pointer; and executing, by the first CPU for each of the one or more critical section functions, the critical section function based on the function pointer and the parameter pointer to update the shared data; and storing, by the first CPU after executing all of the one or more critical section functions, the updated shared data into a memory shared by the plurality of CPUs.

In some embodiments, the operations may further comprise, after executing each of the one or more critical section functions: obtaining, by the first CPU based on a cache coherence protocol, an address of an identifier associated with the critical section function, wherein the identifier is preset by a third CPU associated with the critical section function; and clearing, by the first CPU based on the address, the identifier using a remote write command to notify the third CPU that the execution of the critical section function is complete.

In some embodiments, the operations may further comprise, if the first CPU obtains the lock: placing, by the first CPU, the lock into a cache memory shared by the plurality of CPUs after executing the critical section function and the one or more critical section functions based on the one or more memory indices.

With the multi-core processor system and the data update method according to one or more embodiments of the specification, the bit of a lock memory for a lock-applying CPU is set such that the lock-owning CPU may directly call and execute a critical section function corresponding to the lock applicant according to a memory index. As a result, the lock applicant does not need to migrate the lock and shared data into a local private cache thereof, which reduces migration of the lock and shared data and improves the processing efficiency of operations on the shared data by multiple threads.

BRIEF DESCRIPTION OF THE DRAWINGS

To more clearly describe the technical solutions in one or more embodiments of the specification or in current technologies, the accompanying drawings to be used in the description of the embodiments or current technologies will be briefly described. Obviously, the accompanying drawings in the description below are merely some embodiments recorded in one or more embodiments of the specification, and one of ordinary skill in the art may obtain other drawings according to the accompanying drawings without inventive effort.

DETAILED DESCRIPTION

To enable one of ordinary skill in the art to better understand the technical solutions in one or more embodiments of the specification, the technical solutions in one or more embodiments of the specification will be clearly and completely described below with reference to the accompanying drawings in one or more embodiments of the specification. It is obvious that the described embodiments are merely some, but not all, embodiments of the specification. Based on one or more embodiments of the specification, all other embodiments obtainable by one of ordinary skill in the art without inventive effort shall fall within the protection scope of the present disclosure.

A method for updating shared data in a multi-core processor environment is provided in some embodiments of the specification. The method is applied to an environment comprising a multi-core processor.

Figure 1:
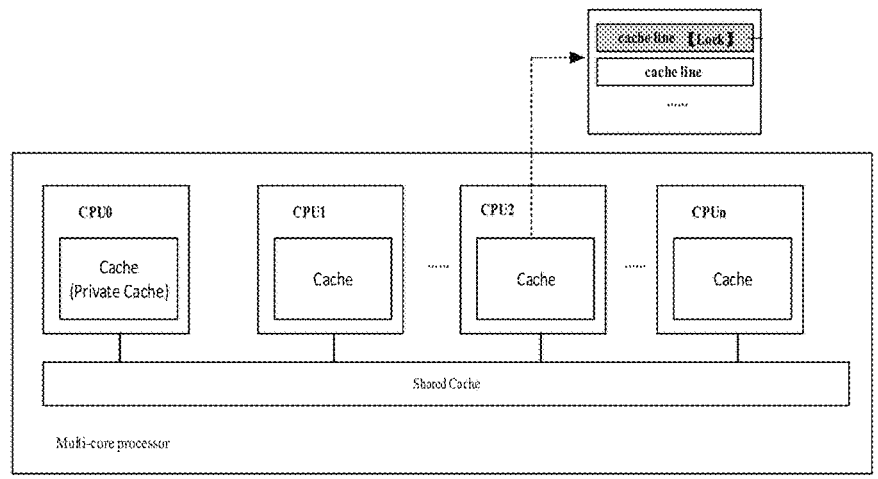
FIG. 1 is a schematic diagram of a multi-core processor according to one or more embodiments of the specification.

FIG. 1 is a schematic diagram of a multi-core processor according to one or more embodiments of the specification. As shown in FIG. 1, a multi-core processor may comprise a plurality of CPUs, such as CPU1, CPU2, CPUn, etc. Each CPU may have its own private cache. The plurality of CPUs may have a shared cache. This specification uses "cache" and "memory" interchangeably.

In some embodiments, the multi-core processor may be used to process a multi-threaded task. For example, a task may activate 256 threads, and these 256 threads may be executed in parallel on the multi-core processor. There may be global shared data (Shared_Data) among at least some of these threads to be updated by the threads. However, only one thread may update the shared data at one time to prevent data errors. In some embodiments, a lock (Lock) may be used to control which thread to update the shared data, and only a thread that successfully obtains the lock will have the permission to update the shared data.

In some embodiments, each CPU in the multi-core system processor in FIG. 1 may correspond to one of the multiple threads. For example, CPU1 may be used to run Thread 1, CPU2 may be used to run Thread 2, and so on. When a thread runs on a first CPU, the first CPU may request for a lock to execute a critical section function associated with the thread on the shared data; the lock provides permission to update the shared data, and the critical section function updates the shared data. If the lock is successfully obtained, the thread may perform an update operation on the shared data. For example, if CPU1 obtains the lock, then the corresponding Thread 1 may update the shared data (Shared_Data). If the lock is occupied by a second CPU, the first CPU may set a memory index corresponding to the critical section function in a memory of the lock for the second CPU to execute the critical section function based on the memory index.

In some embodiments, a CPU requests for the lock through a lock requesting command; the lock requesting command includes the memory index corresponding to the critical section function. When a CPU obtains the lock, the CPU becomes an owner of the lock and may also be referred to as a "lock-owning CPU." In some embodiments, the "lock-owning" CPU may migrate the lock into its private cache, and the lock may occupy one or more cache lines in the private cache of the CPU. For example, as shown in FIG. 1, assuming that CPU2 becomes the owner of the lock, then the lock is migrated into the private cache of CPU2 and occupies one cache line. The cache line occupied by the lock may be referred to as a lock memory or a memory of the lock.

In some embodiments, a lock requesting CPU may set, based on the memory index included in the lock requesting command, a bit corresponding to the memory index in the memory of the lock to 1. For example, the lock memory is cleared by default to 0. After CPU2 owns the lock, the lock content may be set to non-0. More specifically, a bit in the lock memory corresponding to a memory index associated with CPU2 may be set to 1.

Figure 2:
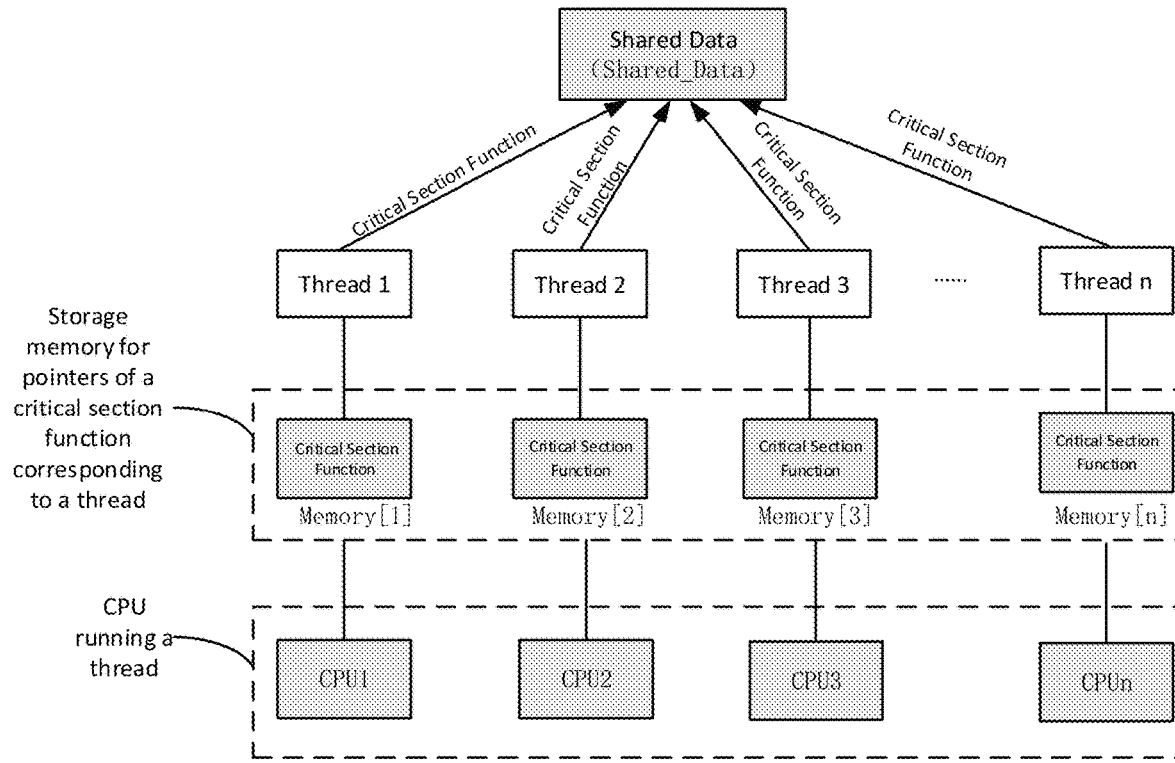
FIG. 2 is a schematic diagram of the principle of multi-threaded update of shared data according to one or more embodiments of the specification.

FIG. 2 is a schematic diagram of the principle of multi-threaded update of shared data according to one or more embodiments of the specification. As shown in to FIG. 2, one or more threads, such as Thread 1, Thread 2, Thread 3, and the like, may update the shared data (Shared_Data) through one or more critical section functions. A critical section function may be a segment of code executing an update operation on the shared data, and the shared data may be updated when such function is executed. Different threads may all update the shared data through different critical section functions.

In some embodiments, for each of the one or more critical section functions, a function pointer and a parameter pointer associated with the critical section function may be stored in a segment of a memory. For example, the pointers (e.g., function pointer and parameter pointer) of the critical section function associated with Thread 1 may be stored in a segment of the memory, while the pointers of the critical section function associated with Thread 2 may be stored in another segment of the memory, and so on. Moreover, the segments of the memory may be indexed. As shown in FIG. 2, in an exemplary manner, the pointers of the critical section function associated with Thread 1 are stored in Memory[1], the pointers of the critical section function associated with Thread 2 are stored in Memory[2], etc. In this specification, an index of a segment of the memory is referred to as a "memory index." For example, the memory index of Memory[2] is "2."

In some embodiments, a CPU running a thread may apply for the lock by sending a lock requesting command; the lock requesting command includes a memory index corresponding to the critical section function to be executed. For example, assuming that Thread 0 through Thread 100 are to update the shared data (shared_data), the pointers of the critical section function associated with Thread 0 are stored in Memory[0] and the pointers of the critical section function associated with Thread 8 are stored in Memory[8]. CPU5 is allocated to run Thread 8. CPU5 may send a lock requesting command get_lock (&Lock, n) to obtain the lock, wherein n is the memory index 8, e.g., get_lock (&Lock, 8). Memory[8] stores the pointers of the critical section function to be executed. When CPU5 finds out that the lock has been occupied by another CPU, it may set the $8^{th}$ bit of the lock memory to 1. Subsequently, when the lock-owning CPU finds that the $8^{th}$ bit of the lock memory is set to 1, the lock-owning CPU may obtain the pointers of the critical section function associated with Thread 8 from Memory[8] to execute.

In some embodiments, setting a bit of the lock memory corresponding to a memory index as mentioned in some embodiments of the specification refers to setting the bit of the lock memory corresponding to the memory index to 1. For example, assuming that the pointers (e.g., function pointer and parameter pointer) associated with a critical section function are stored in Memory[8] (memory index is 8), the $8^{th}$ bit of the lock memory may be set to 1 in order to execute the corresponding critical section function.

Figure 3:
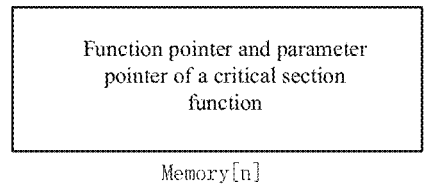
FIG. 3 is a schematic diagram of a memory region according to one or more embodiments of the specification.

FIG. 3 is a schematic diagram of a memory region according to one or more embodiments of the specification. As shown in FIG. 3, a segment in the memory, such as Memory[n], stores a function pointer and a parameter pointer corresponding to a critical section function. Based on the function pointer and the parameter point, a CPU may find the address of the critical section function and subsequently call and execute the function.

In some embodiments, a critical section function may be represented as critical_section(*para). In some embodiments, the address of the critical section function may be 8 bytes long. The "para" may comprise a "void * ret" pointer, wherein the "ret" may be initialized in the local memory of a thread attempting to run the critical section function, and subsequently checked by the thread to determine whether the critical section function is executed. The "para" may also comprise a "void *Shared_Data" representing a pointer pointing to a shared data to be operated by the critical section.

In some embodiments, each thread may correspond to a memory region shown in FIG. 3. For example, assuming that a multi-threaded task activates and runs 256 threads in parallel, there may be a total of 256 memory regions corresponding to the 256 threads. In some embodiments, during the initialization phase of the task, a copy of these 256 memory regions may be saved in each of the plurality of CPUs in FIG. 1 for faster local access. Specifically, a copy of the 256 memory regions may be stored in the private cache of each CPU of the multi-core processor, and each memory region corresponds to a thread. In some other embodiments, the memory regions may be in a shared cache or a memory rather than being copied to the private cache of each CPU. When a CPU is to execute a critical section function in a memory region, the function may be moved to the private cache of the CPU. In addition, a CPU running a thread may know the memory index corresponding to the critical section function that the thread is to execute. For example, if the information associated with the critical section to be executed by Thread2 is stored in Memory[2], the CPU2 running Thread 2 may know that the memory index corresponding to the thread is 2.

Figure 4:
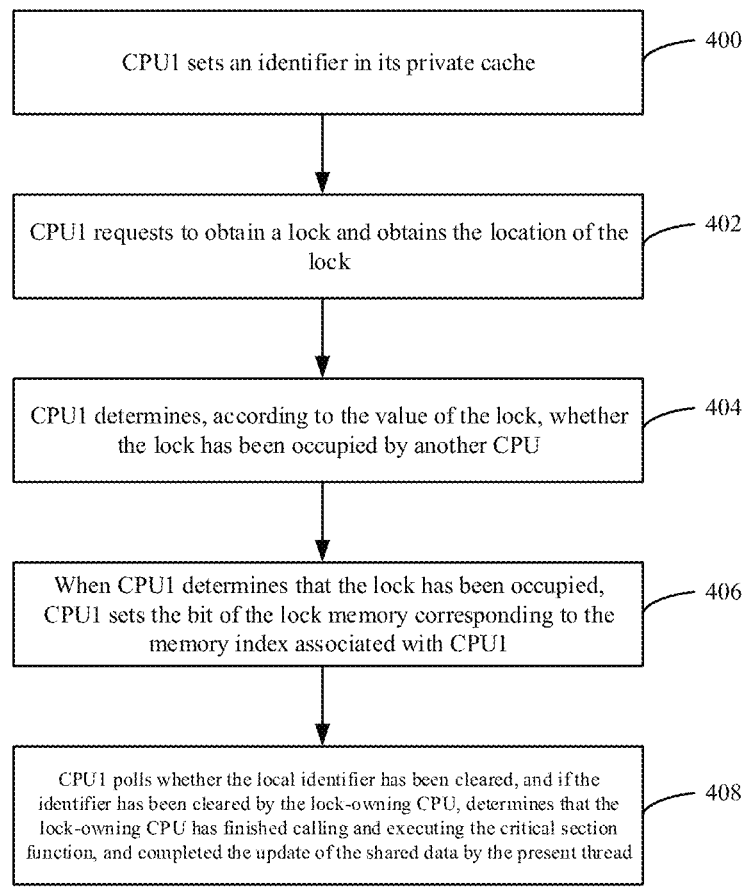
FIG. 4 is a flow chart of a shared data update method according to one or more embodiments of the specification.

FIG. 4 is a flow chart of a shared data update method according to one or more embodiments of the specification. The following description uses the CPU1 in FIG. 1 as an example to illustrate the method for updating shared data. A thread Thread1 running on CPU1 is to execute a corresponding critical section function to update the shared data.

In Step 400, prior to sending a request for a lock to update the shared data, CPU1 sets an identifier in its private cache, wherein the identifier indicates whether the critical section function has been executed. The identifier may be a memory address in the private cache of CPU1. For example, CPU1 may first set para→ret=1 in its private cache, wherein the para→ret is the identifier. The value of the identifier may be subsequently retrieved by CPU1 to determine whether the critical section function has been called and executed by a lock owner. For example, if the identifier is cleared (e.g., para→ret=0), it means the corresponding critical section function has been executed.

In Step 402, CPU1 requests for a lock and obtains the location of the lock.

In this step, CPU1 may send a lock requesting command get_lock(&Lock, n) to request for a lock (Lock). This lock requesting command may attempt to obtain the value of the shared memory lock (Lock). Moreover, the lock requesting command may also carry a memory index n corresponding to CPU1. The information associated with the critical section function to be executed by Thread1 (running on CPU1) is stored in the memory region of Memory[n].

In some embodiments, in the process that CPU1 attempts to obtain the lock, an address of the lock memory may be obtained according to a cache coherence protocol such as MESI (Modified Exclusive Shared Or Invalid) protocol. The address of the lock indicates where the lock is currently stored. For example, CPU1 may find the status of the lock in the shared cache, and the address of the lock showing it is currently in CPU2. Accordingly, CPU1 may retrieve the value of the lock from the private cache of CPU2. It is also possible that the lock may reside in the shared cache.

In Step 404, CPU1 determines, according to the value of the lock, whether the lock has been occupied by another CPU. In some embodiments, the value of the lock indicates the status of the lock. For example, if the value of the lock is 0, it indicates that the lock is not occupied by another CPU. The method then proceeds to steps shown in FIG. 5. If the value of the lock is non-0, it indicates that the lock has been occupied by another CPU.

In Step 406, when CPU1 determines that the lock has been occupied by another CPU, CPU1 sets the bit of the memory of the lock corresponding to the memory index associated with CPU1. For example, when CPU1 determines that the lock has been occupied by CPU2 (meaning the latest value of the lock and the memory of the lock are in the private cache of CPU2), it may set the bit of the lock memory corresponding to the memory index n based on the lock requesting command get_lock(&Lock, n), e.g., setting the $n^{th}$ bit of the memory of the lock to 1.

After the corresponding bit of the memory of the lock is set, CPU1 just needs to wait. The critical section function that was to be executed by Thread1 running on CPU1 will be called and executed by CPU2.

In some embodiments, when the lock-requesting CPU1 determines that the lock has been occupied in this step, setting the corresponding bit of the memory of the lock can be performed at the location where the lock is. For example, the lock memory may be in the private cache of CPU2 or may be at another location such as a shared cache. After the storage location of the lock is found according to the cache coherence protocol, the corresponding bit of the memory of the lock may be set locally (at the location where the lock currently is) without migrating the lock. For example, if the lock is found to be in the private cache of CPU2, the bit setting operation may occur in the private cache of CPU2.

In Step 408, CPU1 polls whether the local identifier has been cleared. If the identifier has been cleared by the lock-owning CPU, CPU1 may then determine that the lock-owning CPU has finished calling and executing the critical section function and updated the shared data.

For example, CPU1 may use a loop while(para→ret==1) to poll whether the identifier in its private cache has been cleared by CPU2. Once the identifier para→ret is cleared, it indicates that the execution of the critical section function associated with Thread1 running on CPU1 has been completed by the lock-owning CPU2, and normal return can be performed. In some embodiments, CPU1 may initially set the identifier to 1 in the local private cache, but the location of the identifier may change during the course of the process. For example, the identifier may be migrated to a shared cache, a memory, or other locations. Regardless of where the identifier is, CPU2 may find the location of the identifier according to the cache coherence protocol and clear the identifier in-place, while CPU1 can also find the location of the identifier and check if it has been cleared by CPU2.

Figure 5:
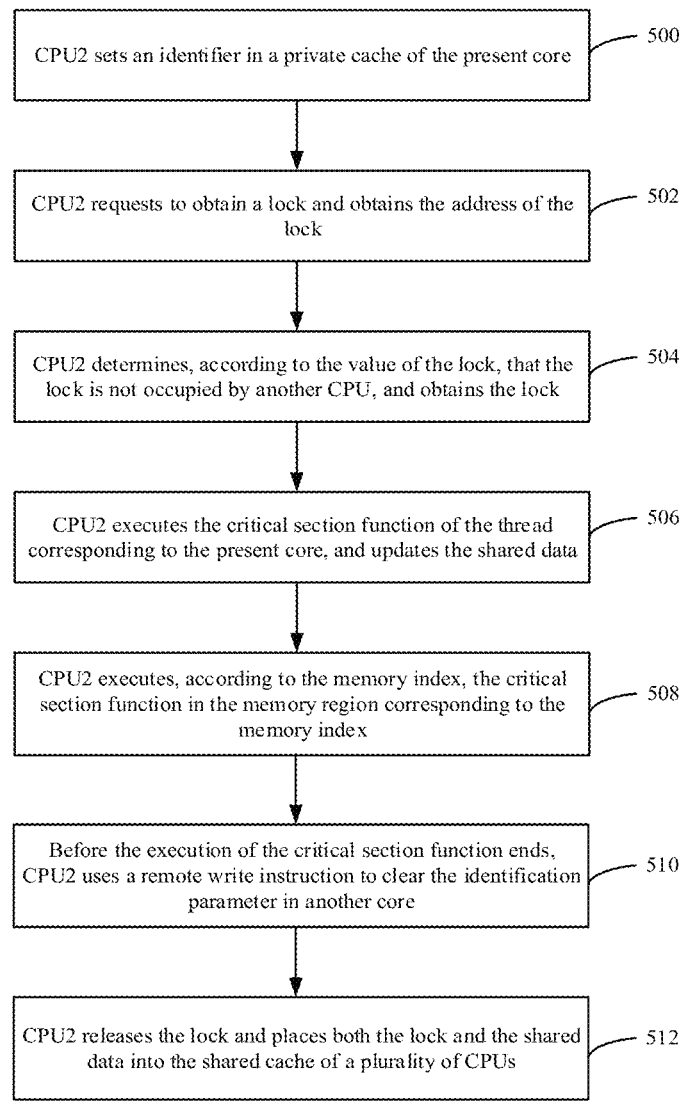
FIG. 5 is a flow chart of another shared data update method according to one or more embodiments of the specification.

FIG. 5 is a flow chart of another shared data update method according to one or more embodiments of the specification. More specifically, FIG. 5 illustrates the steps of the method after a CPU obtains the lock to update the shared data. The following description uses the CPU2 in FIG. 1 as an example to illustrate the method, wherein Thread2 running on CPU2 is to execute a critical section function.

In some embodiments, a CPU may first set the local memory para→ret to non-0 before requesting for a lock, wherein the parameter ret may be referred to as an identifier. In Step 500, CPU2 sets an identifier in its private cache. The identifier notifies CPU2 that, if CPU2 cannot obtain a lock in subsequent steps, whether the lock owner has executed the critical section function.

In Step 502, CPU2 requests to obtain a lock and obtains the address of the lock. In this step, CPU2 may send a lock requesting command get_lock(&Lock, n) to request for the lock (Lock). This lock requesting command may obtain the value of the shared memory lock (Lock). Moreover, the lock requesting command may also carry a memory index n corresponding to CPU2, wherein the information associated with the critical section function to be executed is stored in the memory region Memory[n].

In Step 504, CPU2 determines, according to the value of the lock, that the lock is not occupied by another CPU, and CPU2 obtains the lock.

For example, if the value of the lock is 0, it indicates that the lock is not occupied by another CPU. If the value of the lock is non-0, it means that the lock has been occupied by another CPU. In this case, assuming that CPU2 finds the value of the lock to be 0, CPU2 obtains the lock. In some embodiments, CPU2 may also migrate the lock into the private cache of CPU2.

In addition, after obtaining the lock, CPU2 may set the bit corresponding to n (as indicated in the lock requesting command get_lock(&Lock, n)) in the memory of the lock to 1, such that the value of the lock becomes non-0. Since CPU2 itself is the lock owner, CPU2 may also clear the identifier para→ret set in Step 500. In some embodiments, CPU2 may clear its own identifier before the execution of the critical section function ends. In some embodiments, the critical section function may comprise a remote_write as its last step to clear the corresponding identifier set by CPU2.

In Step 506, CPU2 executes the critical section function associated with Thread2, and updates the shared data.

In some embodiments, a copy of the information associated with all critical section functions to be executed may be stored in the private cache of each CPU, including CPU2. To execute the critical section function, CPU2 may only need to retrieve the locally stored information (including the function pointer and the parameter pointer) associated with the critical section function, find the function and execute it.

After the critical section function of Thread2 running on CPU2 is executed, CPU2 may determine if a memory index corresponding to another CPU is further set in the lock memory. For example, if CPU2 finds that the bit 3 of the lock memory is set to 1, then a memory index "3" is obtained, which indicates that another thread has also requested the lock and is waiting to execute a critical section function corresponding to the other thread.

In Step 508, CPU2 executes, according to the memory index, the critical section function in the memory region corresponding to the memory index. In this step, for example, the memory index is 3, and CPU2 may find a corresponding memory region Memory[3]. According to the function pointer and the parameter pointer stored in this memory region, CPU2 executes the critical section function to update the shared data. For example, memory[3].critical_section(memory[3].para) may be executed. In some embodiments, the critical section function may comprise a shared data write instruction Shared_write to execute a write operation on the shared data.

In Step 510, before the execution of the critical section function ends, CPU2 uses a remote write instruction to clear the identifier in another CPU. Even though a critical section function may be defined in various ways, in some embodiments, it may include a remote write instruction remote_write as its last step to execute a clearing operation on an identifier, as follows: critical_section(void *para) { . . . , remote_write(para→ret, 0); return;}

If CPU2 executes its own critical section function, and CPU2 finds that the identifier is local at CPU2, then the identifier can be cleared locally. If CPU2 executes a critical section function corresponding to CPU3, an address of an identifier corresponding to the critical section function may be obtained according to the cache coherence protocol (e.g., in the private cache of CPU3, or may be in other places, such as the shared cache), and the identifier may be cleared in-place through remote_write(para→ret, 0) without migrating the para→ret to the local private cache of CPU2.

From CPU3's point of view, as described in Step 408 in FIG. 4, it continuously polls whether its identifier has been cleared after the memory of the lock in CPU2 is set. If the identifier has been cleared by the lock-owning CPU2, CPU3 may determine that the execution of its corresponding critical section function by CPU2 has completed, and the update of the shared data by the thread of CPU3 is finished.

After completing the execution of the critical section function corresponding to CPU3, CPU2 continues to check if there are other critical section functions to be executed. The process will be the same as mentioned above and will not be described in detail. When CPU2 finds that all critical section functions to be executed have been executed, it proceeds to Step 512.

The manner in which a lock-owning CPU obtains a memory index set by another CPU in the lock memory is described below. In some embodiments, the lock-owning CPU may execute a lock releasing command to obtain a return value, wherein the return value comprises an XOR value of an initial state and a current state of the memory of the lock. More specifically, after the critical section function of the thread corresponding to the present CPU (e.g., CPU2) is executed, the CPU executes a lock releasing command ret=put_lock(&Lock, 0×01). The execution of this lock releasing command indicates that the lock is to be released. Moreover, this lock releasing command put_lock may have a return value ret, which determines whether the lock can be released. The return value ret may be an XOR value between an initial lock memory and the current lock memory.

For instance, after initially obtaining the lock, CPU2 may set the lock memory to 0010. Subsequently, while CPU2 is executing its own critical section function, two other CPUs may apply for the lock and set their own memory indices in corresponding bits of the lock memory, and the current lock memory may become, for example, 1110. In this case, by performing an XOR operation on "0010" and "1110," the return value is "1100," indicating that the two bits of "11" are newly set. Therefore, CPU2 may obtain memory indices of the other two CPUs according to the return value.

According to the obtained memory indices, CPU2 may execute corresponding critical section functions of the other two CPUs. At the same time, CPU2 may also reset the lock memory to the initial lock memory 0010. When CPU2 completes execution of critical section functions corresponding to the two bits of "11," CPU2 may again execute ret=put_lock(&Lock, 0×01). If a new CPU sets a memory index during this period, the return value ret will be non-0, and the new memory index set by the new CPU may be obtained through the return value. If no other CPU sets a new memory index during this period, the return value ret will be 0000, and CPU2 may then confirm that all critical section functions have been called, and Step 512 may be executed.

In Step 512, CPU2 releases the lock and places both the lock and the shared data into the shared memory of the plurality of CPUs. In this step, critical section functions of all lock requesters have been executed, including all critical section functions corresponding to all memory indices set in the memory of the lock, for example, the critical section function associated with the present (lock-owning) CPU and critical section functions corresponding to memory indices set by other CPUs.

After all critical section functions have been executed, CPU2 may place the lock and the shared data updated by shared data write commands into the shared memory of the plurality of CPUs. After the lock is placed into the shared memory, the memory of the lock may also be in the shared memory. Here, the shared data placed into the shared cache may be the shared data operated on by the shared data write commands. For example, the shared data may have a total of four cache lines, while one of the threads updates one of the cache lines of the shared data, and the other thread updates the content in another cache line of the shared data. In some embodiments, only the updated cache lines are placed into the shared cache. In addition, after the lock and the shared data are placed into the shared cache, the lock and the shared data in the private cache of CPU2 may be invalidated.

At this point, the lock-owning CPU2 has released the lock, placed the lock into the shared cache of the plurality of CPUs, and also placed the latest shared data into the shared cache. The multi-core system processor has completed all update operations by the multi-threaded task on the shared data.

In the flow shown in FIG. 5, Step 506 through Step 512 are atomic operations to update the shared data. After a CPU successfully obtains the lock, the CPU would execute all waiting critical section functions one by one. Only after all critical section functions have been executed does the CPU release the lock and simultaneously place the lock and the shared data into the shared cache, such that the next lock owner obtains the lock and the shared data from the shared cache.

The data update method provided in at least one embodiment of the specification may achieve the following effects:

First, when finding that the lock has been occupied by CPU2, a lock applicant, such as CPU1 just needs to set a memory index corresponding to CPU1 in the memory of the lock occupied by CPU2. According to this index, CPU2 can execute a critical section function corresponding to CPU1, while CPU1 just needs to wait for the execution of this critical section function to complete. CPU1 will not migrate the lock to the local private cache. In this way, the back and forth migration among the CPUs is avoided, which improves the execution efficiency of multi-threaded tasks. Moreover, after the CPU1 sets a memory index in the memory of the lock, the lock-owning CPU2 executes the critical section function corresponding of CPU1, and also updates the shared data locally at CPU2, which also avoids the migration of the shared data.

Second, after the lock owner completes the critical section function associated with the lock applicant, the lock owner may clear the identifier of the lock applicant to notify the lock applicant that its critical section function has been executed. This clearing operation does not migrate the identifier in the private cache of the lock applicant to the local of the lock owner, but finds the location of the identifier, e.g., in the private cache of the CPU that applies for the lock, according to the cache coherence protocol, and clears in-situ. This operation reduces the migration of data among the CPUs, which also improves the execution efficiency of multi-threaded tasks.

Third, after completing the execution of all critical section functions, the lock owner places both the lock and the shared data into the shared cache, rather than in the private cache of the lock owner, which can accelerate the next access operation on the lock and the shared data, avoid data migration caused by the need for another CPU to enter the private cache of the previous lock owner during next access, and also accelerate the next access to critical section shared data, which helps improve the execution efficiency of multi-threaded tasks.

Fourth, the lock owner executes operations of a plurality of critical section functions, and all update operations on the shared data are completed in the local private cache of the lock owner, which avoids data migration and accelerates data update.

Fifth, this solution may be based on a physical CPU architecture that is fully equal and random, which is a solution with optimized and combined software and hardware. The solution reduces the complexity of hardware development, completes the complex interaction process at a minimum hardware cost, and improves the overall performance For example, in the present solution, a lock applicant just needs to set the bit of the memory of the lock corresponding to the memory index associated with the critical section function that it attempts to execute, and the lock owner can know which critical section function to execute according to the return value of the put_lock instruction, which achieves CPU interaction in a very convenient and simple way. For another example, the lock owner can obtain, according to the cache coherence protocol, the location of an identifier, and use the remote_write instruction to clear the identifier in-situ without executing an operation to migrate the identifier to the private cache of the lock owner, which avoids data migration. This solution with optimized and combined software and hardware not only improves the performance of the multi-core system processor, but also avoids high hardware price.

The multi-core processor adopting the shared data updating method provided in the embodiments of the specification reduces the contention and migration of the shared data and lock when executing a multi-thread task to update the shared data, which can greatly reduce the operating time and improve the overall throughput.

In addition, the data update method is not limited to the specific manners described in the embodiments of the specification and may be changed flexibly.

For example, in the flows described in FIG. 4 and FIG. 5, after completing the execution of all critical section functions, the lock owner may leave the lock and the shared data in the private cache of the lock owner, which can be directly accessed by next accessing party. In this way, a lock applicant still does not need to migrate the lock and the shared data into its own private cache. Instead, the lock owner just needs to directly call the critical section function of the lock applicant. Therefore, the task processing efficiency can still be improved to certain extent.

For another example, the lock owner can notify the lock applicant that its critical section function has been executed in a manner other than clearing the identifier. In addition, even if the lock owner does not use the remote write instruction but migrates the identifier of the lock applicant to the local for updates, the lock migration is similarly avoided since the lock applicant does not need to migrate the lock into its own private cache when the critical section function is being executed. Therefore, the task processing efficiency can still be improved to certain extent.

For yet another example, after setting a bit of the lock memory corresponding to a memory index, the lock-requesting CPU may also not poll whether the waiting critical section functions have been executed. The lock owner may execute a corresponding critical section function according to the memory index.

It is appreciated by one of ordinary skill in the art that in exemplary implementations, the processing of steps in the flow in FIG. 4 or FIG. 5 may be changed in some cases. For example, only some steps thereof may be executed, as long as the migration of the lock or data is reduced, and the task execution efficiency is improved.

The order of execution of the steps in the flow shown in the figures above is not limited to the order in the flow chart. In addition, the description of each step may be implemented in a form of software, hardware, or a combination thereof. For example, one of ordinary skill in the art may implement it in a form of software code, which can be a computer executable instruction capable of implementing logic functions corresponding to the steps. When implemented in a form of software, the executable instruction may be stored in the memory and executed by a processor in the device.

The terms of "including," "comprising," or any other variants of the terms are intended to encompass a non-exclusive inclusion, such that a process, method, commodity, or device comprising a series of elements not only comprises these elements, but also comprises other elements that are not clearly listed, or further comprises elements that are inherent to the process, method, commodity, or device. When there is no further restriction, elements defined by the statement "comprising one . . . " does not exclude that a process, method, commodity, or device comprising the above elements further comprises additional identical elements.

One of ordinary skill in the art should understand that one or more embodiments of the specification may be provided as a method, an apparatus, a system, or a computer program product. Therefore, one or more embodiments of the specification may be implemented as complete hardware embodiments, complete software embodiments, or embodiments combining software and hardware aspects. Moreover, one or more embodiments of the specification may be in the form of a computer program product implemented on one or more computer usable storage media (including, but not limited to, a magnetic disk memory, CD-ROM, an optical memory, etc.) comprising computer usable program codes.

One or more embodiments of the specification may be described in a general context of a computer executable instruction that is executed by a computer, such as a program module. Generally, the program module comprises a routine, a program, an object, a component, a data structure, etc. for executing a particular task or implementing a particular abstract data type. One or more embodiments of the specification may also be practiced in distributed computing environments. In these distributed computing environments, remote processing devices connected via communication networks carry out tasks. In the distributed computing environments, a program module may be located in local and remote computer storage media, including storage devices.

The embodiments in the specification are described in a progressive manner with each embodiment focused on differences from other embodiments, and the embodiments may be mutually referenced for identical or similar parts. In particular, the data processing device embodiment is described in a relatively simple manner, as it is substantially similar to the method embodiment. The description of the method embodiment may be referenced for the related parts.

Exemplary embodiments of the specification are described above. Other embodiments are in the scope of the appended claims. In some cases, the actions or steps recorded in the claims may be executed in an order different from that given in the embodiments and can still achieve the desired results. In addition, it is not necessarily required that the process described in the accompanying drawings has to be in the given specific sequence or a continuous sequence so as to achieve the desired results. In some embodiments, multitasking processing and parallel processing are also acceptable or may be favorable.

The above-described are only preferred embodiments of one or more embodiments of the specification, which are not used to limit one or more embodiments of the specification. Any modification, equivalent substitution, or improvement made within the spirit and principle of one or more embodiments of the specification shall be encompassed by one or more embodiments of the specification.

What is claimed is:

1. A method for updating shared data in a multi-core processor environment, wherein the multi-core processor comprises a plurality of CPUs, the method comprising:

requesting, by a first CPU, for a lock to execute a critical section function, wherein the lock is configured to provide permission to update the shared data, and the critical section function is configured to update the shared data;

setting, by the first CPU if the lock is occupied by a second CPU, a memory index corresponding to the critical section function in a memory of the lock for the second CPU to execute the critical section function based on the memory index;

obtaining, by the first CPU if the lock is not occupied, the lock to execute the critical section function;

executing, by the first CPU if it obtains the lock, the critical section function;

determining, by the first CPU if it obtains the lock, whether the memory of the lock has one or more memory indices set by one or more of other CPUs, wherein the one or more memory indices correspond to one or more critical section functions; and executing, by the first CPU if the memory of the lock has one or more memory indices set by the one or more of other CPUs, the one or more critical section functions based on the one or more memory indices.

2. The method according to claim 1, wherein the requesting for a lock comprises:

requesting, by the first CPU, for the lock through a lock requesting command, wherein the lock requesting command includes the memory index corresponding to the critical section function.

3. The method according to claim 2, wherein the setting a memory index corresponding to the critical section function in a memory of the lock comprises:

setting, by the first CPU based on the memory index included in the lock requesting command, a bit corresponding to the memory index in the memory of the lock to 1.

4. The method according to claim 1, further comprising:

detecting, by the first CPU, that the second CPU has executed the critical section function; and determining, by the first CPU, that the update on the shared data is complete.

5. The method according to claim 4, further comprising:

setting, by the first CPU, an identifier in a private cache of the first CPU before requesting for the lock to execute the critical section function, wherein the identifier indicates whether the critical section function has been executed, and wherein detecting that the second CPU has executed the critical section function comprises:
  determining, by the first CPU, that the critical section function has been executed by the second CPU if the identifier in the private cache of the first CPU has been cleared.

6. The method according to claim 1, wherein the executing the one or more critical section functions comprises:
  obtaining, by the first CPU for each of the one or more critical section functions, a function pointer and a parameter pointer from a memory region based on the one or more memory indices corresponding to the one or more critical section function;
  executing, by the first CPU for each of the one or more critical section functions, the critical section function based on the obtained function pointer and the obtained parameter pointer to update the shared data; and
  storing, by the first CPU after executing all of the one or more critical section functions, the updated shared data into a memory shared by the plurality of CPUs.

7. The method according to claim 6, wherein the memory region is inside a private cache of the first CPU.

8. The method according to claim 1, further comprising, if the first CPU obtains the lock:
  placing, by the first CPU, the lock into the memory shared by the plurality of CPUs.

9. The method according to claim 1, wherein the determining if the memory of the lock has one or more memory indices set by one or more of other CPUs comprises:
  executing, by the first CPU, a lock releasing command to obtain a return value, wherein the return value comprises an XOR value of an initial state and a current state of the memory of the lock;
  obtaining, by the first CPU, the one or more memory indices set by the one or more of other CPUs based on the obtained return value of the lock releasing command; and
  setting, by the first CPU, the memory of the lock to the initial state.

10. The method according to claim 1, further comprising, after executing each of the one or more critical section functions:
  obtaining, by the first CPU, an address of an identifier associated with the critical section function, wherein the identifier is preset by a third CPU associated with the critical section function; and
  clearing, by the first CPU based on the address, the identifier to notify the third CPU that the execution of the critical section function is complete.

11. An apparatus for updating shared data in a multi-core processor environment, wherein the apparatus comprises a first CPU configured to execute one or more operations comprising:
  requesting for a lock to execute a critical section function, wherein the lock is configured to provide permission to update the shared data, and the critical section function is configured to update the shared data;
  setting, if the lock is occupied by a second CPU, a memory index corresponding to the critical section function in a memory of the lock for the second CPU to execute the critical section function based on the memory index;
  obtaining, if the lock is not occupied, the lock to execute the critical section function;
  executing, if the first CPU obtains the lock, the critical section function;
  determining, if the first CPU obtains the lock, whether the memory of the lock has one or more memory indices set by one or more of other CPUs, wherein the one or more memory indices correspond to one or more critical section functions; and
  executing, if the memory of the lock has one or more memory indices set by the one or more of other CPUs, the one or more critical section functions based on the one or more memory indices.

12. The apparatus according to claim 11, wherein the requesting for a lock comprises:
  requesting for the lock through a lock requesting command, wherein the lock requesting command includes the memory index corresponding to the critical section function;
  migrating, if the first CPU obtains the lock, the lock into a private cache of the first CPU; and
  setting the memory index corresponding to the critical section function in the memory of the lock.

13. The apparatus according to claim 11, wherein the operations further comprise:
  setting an identifier in a private cache of the first CPU before requesting for the lock to execute the critical section function, wherein the identifier indicates whether the critical section function has been executed; and
  determining that the critical section function has been executed by the second CPU if the identifier in the private cache of the first CPU has been cleared.

14. The apparatus according to claim 11, wherein the executing the one or more critical section functions comprises:
  obtaining, for each of the one or more critical section functions, a memory region based on one of the one or more memory indices corresponding to the critical section function, wherein the memory region contains a function pointer and a parameter pointer;
  executing, for each of the one or more critical section functions, the critical section function based on the function pointer and the parameter pointer to update the shared data; and
  storing, after executing all of the one or more critical section functions, the updated shared data into a memory shared by the first CPU and the other CPUs .

15. The apparatus according to claim 11, wherein the operations further comprise, after executing each of the one or more critical section functions:
  obtaining an address of an identifier associated with the critical section function, wherein the identifier is preset by a third CPU associated with the critical section function; and
  clearing, based on the address, the identifier to notify the third CPU that the execution of the critical section function is complete.

16. The apparatus according to claim 11, wherein the operations further comprise, if the first CPU obtains the lock:
  placing the lock into a memory shared by the first CPU and the other CPUs after executing the critical section function and the one or more critical section functions based on the one or more memory indices.

17. A method for updating shared data in a multi-core processor environment, comprising:
  setting, by a first CPU, an identifier in a private cache of the first CPU before requesting for a lock to execute a critical section function on the shared data, wherein the identifier indicates whether the critical section function has been executed;

requesting, by the first CPU, for the lock to execute the critical section function, wherein the lock is configured to provide permission to update the shared data, and the critical section function is configured to update the shared data;

setting, by the first CPU if the lock is occupied by a second CPU, a memory index corresponding to the critical section function in a memory of the lock for the second CPU to execute the critical section function based on the memory index; and determining, by the first CPU, that the critical section function has been executed by the second CPU if the identifier in the private cache of the first CPU has been cleared.

18. A method for updating shared data in a multi-core processor environment, comprising:

requesting, by a first CPU, for a lock to execute a critical section function through a lock requesting command, wherein the lock is configured to provide permission to update the shared data, and the critical section function is configured to update the shared data, the lock requesting command includes a memory index corresponding to the critical section function;

migrating, by the first CPU if it obtains the lock, the lock into a private cache of the first CPU;

setting, by the first CPU, the memory index corresponding to the critical section function in the memory of the lock; and setting, by the first CPU if the lock is occupied by a second CPU, the memory index corresponding to the critical section function in a memory of the lock for the second CPU to execute the critical section function based on the memory index.

* * * * *